United States Patent [19]

Theodore et al.

[11] 4,364,783
[45] Dec. 21, 1982

[54] ULTRASONIC END-CAPPING OF BETA"-ALUMINA TUBES

[75] Inventors: Ares N. Theodore, Farmington Hills; Robert A. Pett, Franklin, both of Mich.

[73] Assignee: Ford Motor Company, Dearborn, Mich.

[21] Appl. No.: 300,404

[22] Filed: Sep. 8, 1981

[51] Int. Cl.³ .................. B29C 27/08; C04B 35/44; C04B 35/64
[52] U.S. Cl. .................................... 156/69; 156/73.1; 156/89; 156/244.13; 156/244.24; 264/23; 264/63; 264/209.1; 264/332
[58] Field of Search .................. 156/69, 73.1, 145, 89, 156/244.13, 244.24, 307.1; 264/23, 63, 209.1, 126, 332

[56] References Cited

U.S. PATENT DOCUMENTS

| 3,556,884 | 1/1971 | McGrath | 156/73.1 |
| 4,158,688 | 6/1979 | Pett et al. | 264/63 |
| 4,158,689 | 6/1979 | Pett et al. | 264/63 |
| 4,289,719 | 9/1981 | McIntosh et al. | 264/332 |

OTHER PUBLICATIONS

Report entitled "Fabrication of Thin Layer Beta'-Alumina", by Gerald J. Tennenhouse and Robert A. Pett, prepared for the National Aeronautics and Space Administration and submitted pursuant to Contract NAS 3-1982.

Primary Examiner—Michael G. Wityshyn
Attorney, Agent, or Firm—Lorraine S. Melotik; Roger L. May

[57] ABSTRACT

This invention comprises a method of ultrasonically end-capping a tubular green body which comprises a mixture of 40-60 volume percent sinterable beta"-alumina precursor particulate and 60-40 volume percent organic sacrificial binder wherein said sacrificial binder comprises a thermoplastic elastomer, a plasticizer which may be oil, wax or oil and wax, stiffening polymers, a processing aid and optional components. The tube is preferably formed by extrusion molding. The green body tube may be end-capped by ultrasonic forming or by ultrasonic bonding of an end-cap to the tube. During this process, ultrasonic vibration energy is dissipated as heat energy which melts the thermoplastic binder composition and welds the joining surfaces.

29 Claims, 2 Drawing Figures

ULTRASONIC END-CAPPING OF BETA"-ALUMINA TUBES

Reference is made to commonly assigned and concurrently filed U.S. applications Ser. Nos. 300,368 entitled "Process For Molding Complex Beta"-Alumina Shapes For Sodium/Sulfur Batteries" to Theodore et al and 300,369 "Preparation of Beta"-Alumina Tubes by the Extrusion Process" to Theodore et al.

BACKGROUND OF THE INVENTION

This invention relates to preparation of end-capped tubular beta"-alumina ceramic bodies. In particular, this invention relates to ultrasonic end-capping of extruded beta"-alumina tubular ceramic precursors, also known as green bodies, such that after binder removal and sintering the bond is hermetic and the integrity of the bonded area is comparable to the body of the tube.

Beta"-alumina tubes need to be end-capped at one end in order to be used in construction of sodium-sulfur batteries or similar energy conversion devices. Ultrasonic end-capping as taught in this invention, can proceed by either of two routes, ultrasonic forming or ultrasonic bonding, with the latter being preferred. During the end-capping process, the ultrasonic vibrations from the ultrasonic horn are transmitted to the part and travel to the joint area of interface. Here the vibratory energy is dissipated in the form of frictional heat which melts the binder and welds the joining surfaces.

While ultrasonic bonding technique is known, it has only been used to bond materials of thermoplastic compositions. In contrast, the composition of the tubular bodies of the subject invention comprise a thermoplastic elastomer binder in combination with ceramic particulate. In view of the different characteristics of thermoplastic elastomers, it was not expected that such technique could be used to bond compositions containing these elastomers. Further, using beta"-alumina particulate precursor in the composition of the tubes, in view of its hydroscopic nature, was expected to result in an unsatisfactory bond due to the foaming conditions that were expected to develop at the joint interface of such materials during bonding. Still further, the composition of the tubular bodies, which includes waxes and oils as plasticizers, was not felt suitable for ultrasonic technique in view of the fact that these included materials usually interfere with the resins ability to transmit vibratory energy. Also, the inclusion of high levels of precursor ceramic, as in the subject composition, was thought to preclude the presence of a sufficient amount of binder material deemed necessary for successful bonding. Tubes which have been extruded using the composition of this invention had previously been end-capped using solvent bonding. However, that technique is less reliable due to such problems as bubbling of the solvent and misalignment of the cap to the tube.

This invention permits improvements in the end-capping of green body tubes comprised of a mixture of sacrificial binder, densely packed with powdered beta"-alumina precursor particulate such that after binder removal and sintering, the bond is hermetic and the integrity of the bonded area is comparable to the body of the tube. U.S. Pat. Nos. 4,158,688 and 4,158,689 to Pett et al which are commonly assigned with this application, disclose preparation of green bodies of unusual dimensional precision using sacrificial binders similar to that of this invention. In these patents, the green bodies formed include compression molded cordierite ribbed sheets and extrusion molded beta"-alumina precursor particulate tubes. The extrusion composition used to make the tubes would not be optimal for use as the composition of the tubes which are ultrasonically end-capped by the process of the subject invention.

BRIEF DESCRIPTION OF THE INVENTION

This invention relates to a method of ultrasonically end-capping a tubular green body so that after binder removal and sintering, the bond is hermetic and the integrity of the bonded area is comparable to the body of the tube. The method comprises providing a tubular green body comprised of a mixture of about 40–60 volume percent sinterable particulate solids and 60–40 volume percent organic sacrificial binder, wherein the binder consists essentially of (a) a thermoplastic block copolymer component selected from the group consisting of linear, radial, and linear and radial block copolymers, having a first aromatic block which is glassy or crystalline at 20–25 has a softening point between about 80°–250° C. and a second aliphatic block which is different from the first block and behaves as an elastomer at temperatures between about 15° C. below and about 100° C. above said softening point of the first block, (b) oil at least about 75 percent by weight of which boils in a range between about 285°C.–560° C., and which has a viscosity of between about 30–220 Saybolt Universal Seconds (SUS) at 100° C., and has an Aniline Point in a range between about 75°–125° C.; (c) wax which melts at a temperature in a range between about 55°–80° C., at least 75 percent by weight of which boils at temperatures in a range between about 315° C.–490° C.; (d) a first stiffening thermoplastic polymer which is glassy or crystalline at 20°–25° C., has a softening point between about 80°–250° C. and comprises aromatic monomeric units associable with block (a); (e) a second stiffening thermoplastic polymer, different from the first polymer, and which is glassy or crystalline at 20°–25° C., has a softening point between about 80°–250° C. and comprises aromatic monomeric units associable with block copolymer (a) and (f) processing aid comprising esters of fatty acids, wherein the sinterable particulate solids consists essentially of a particle size distribution of beta"-alumina particulate precursor solids, and the weight of (a) being greater than (b) and (c) combined, greater than (d) and (e) combined and greater than about two times (b), (c), (d) (e) or (f) alone; forming an end-cap of desired configuration having a composition comprising said mixture, applying pressure and ultrasonic vibrations by means of an ultrasonic horn to the tubular green body and end-cap between a tubular mandrel and the ultrasonic horn maintaining the pressure and ultrasonic vibrations for a time necessary for the ultrasonic vibrations to travel to the tubular body end-cap interface wherein they are dissapated in the form of frictional heat and melt the thermoplastic elastomer binder so as to weld the joining surfaces. The mandrel has a shaped end of desired configuration and the ultrasonic horn has a female mold shape adapted to receive the mandrel with the tubular body disposed thereon.

More particularly in ultrasonic bonding, the end-cap is first formed by molding or stamping from the same ceramic binder composition as is used to form the tube. This end-cap is then placed on the top of the mandrel having the tubular green body thereon or up into the horn. Most preferably, the tubular mandrel has a hemispherically shaped end as does the face of the horn. In ultrasonic forming, the end-cap is formed by forcing the tubular green body between the mandrel and the ultrasonic horn both of which preferably have a hemispherical end shape while ultrasonic vibrations are applied through the horn. The improved method of the invention will be more fully understood from the following detailed description of the invention when read in conjunction with the drawings.

DETAILED DESCRIPTION OF THE INVENTION

Figures 1, 2:
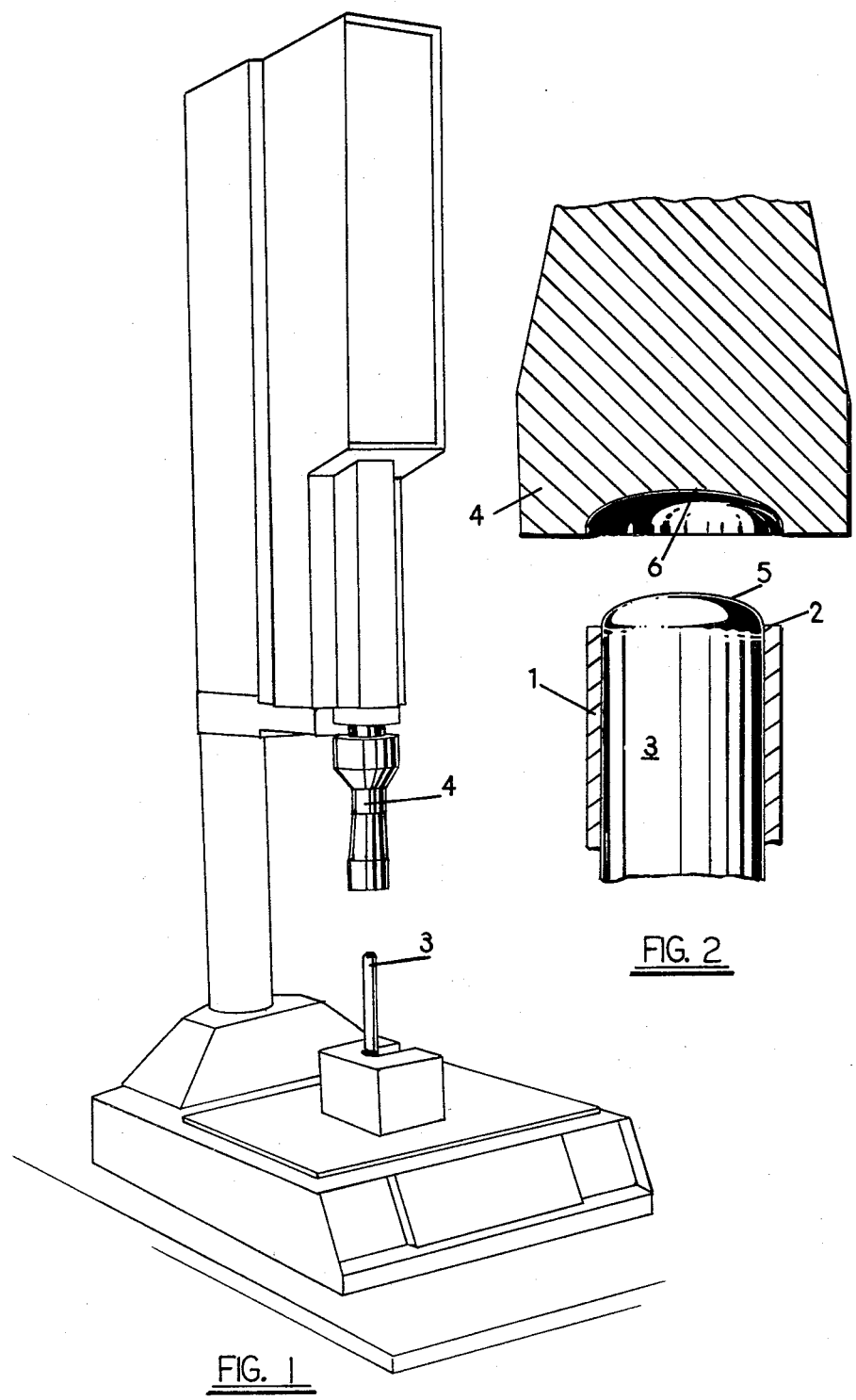
FIG. 1 illustrates ultrasonic welding equipment suitable to perform the end-capping of the subject invention.
FIG. 2 is a fragmentary cross section view of the horn and mandrel-tube taken along the central axis of the mandrel.

As described above, the improved method of the invention relates to the ultrasonic end-capping of tubular green bodies comprising a mixture of beta"-alumina precursor particulate and sacrificial binder. Each of the components of the mixture within the scope of the invention as well as the processing steps are described hereinafter in greater detail.

The tubular green bodies which can be end-capped by the method of this invention may be formed by either compression or extrusion molding. However, they are preferably prepared by extrusion molding such as by the method disclosed in concurrently filed U.S. application Ser. No. 300,369 entitled "Preparation of Beta"-Alumina Tubes By The Extrusion Process" to Theodore et al. The green bodies taught and claimed therein can be end-capped by the ultrasonic method of the subject invention. End-capping should be done as soon after extrusion of the tubing as is practical, preferable within two weeks. End-capping by ultrasonic bonding or ultrasonic forming can be performed by means of the ultrasonic welder, Branson Model 400C shown in FIG. 1. FIG. 2 illustrates in detail the horn and mandrel of FIG. 1 as well as the tube placement. In end-capping by either bonding or forming, a tube 1 which has been carefully cut to give a smooth surface whose face 2 is perpendicular to the length of the tube is placed over the mandrel 3. The mandrel as well as the ultrasonic horn 4 preferably have hemispherically shaped ends 5 and 6 respectively. In ultrasonic bonding, an end-cap may be formed by stamping or cutting a disc from a sheet of material having the same composition and approximate thickness as that of the tube walls. This end-cap also preferably has a hemispherical shape. This end cap is then placed centrally up into the ultrasonic horn or preferably on top of the mandrel. The horn is then brought down over the mandrel and pressure and ultrasonic vibrations are applied to weld the joining surfaces. In ultrasonic forming, a tube like that above is placed over the mandrel. The ultrasonic horn is then brought down over the tube to contact the tube while ultrasonic vibrations are applied, thus forming the tube into an end cap. Ultrasonic vibrations and pressure are applied to weld the joining surfaces. In both the bonding and forming end-capping process, it is preferable to rotate the tube during the process.

In the subject invention, circular high gain horns are preferably used. The crown section of the horn is of size of the tubular green body used. Ultrasonic end capping as taught in this application is generally performed on green body tubes which have a wall thickness of 3 mm or less, however, tubes having a wall thickness greater than 3 mm may also be end capped by the process of this invention. Ultrasonic welding of binder ceramic compositions as carried out in this invention is fast, clean and produces excellent joint integrity. This process causes minimum distortion and material degradation. After burn out and sintering, tube and end cap have densities 98% of theoretical and the line of demarcation between the end cap and the tube no longer exists. The interface between the tube and end cap now appears to have the same properties as the tube.

The following lists the preferred ranges of binder components, including optional components.

Sacrificial Binder

The sacrificial binders of this invention comprise a major amount by weight of a block copolymer thermoplastic elastomer, plasticizer therefor and thermoplastic polymer.

The block copolymer may be a linear block copolymer such as is disclosed in U.S. Pat. No. 4,158,689, a radial block copolymer such as is disclosed in U.S. Pat. No. 4,158,688, or a combination of these block copolymers. The disclosures of U.S. Pat. Nos. 4,158,688 and 4,158,689 are hereby incorporated by reference.

Suitable radial block polymers for use in this invention are those having the structural formula

wherein "X" is a linking group, A or B, "α" is 0 or a positive integer, "α" is a positive integer greater than 2, "A" is a linear or branched polymer that is glassy or crystalline at room temperature 80°–250° C. and has its softening point in the range of about 80° C. to about 250° C. and "B" is a polymer different from "A" that behaves as an elastomer at processing temperatures, i.e., between about 15° C. below and about 100° C. above the softening point of "A".

Suitable linear block polymers for use in this invention are those having the structural formula

wherein "α" is 0 or a positive integer, "A" is a linear or branched polymer that is glassy or crystalline at room temperature and has a softening point in the range of about 80° C. to about 250° C. and "B" is a polymer different from "A" that behaves as an elastomer at processing temperatures.

Linear and radial block copolymers are widely known. Commercially available linear and radial block copolymers are Kratons and Solprenes, respectively. Kraton is a tradename of Shell Oil Company and Solprene is a tradename of Phillips Petroleum Company. Other examples of these polymers appear in *Rubber Technology*, "Thermoplastic Elastomers," Hendricks et al, 2nd Edition, pp. 515∝533, VAN NOST RAND, N.Y. (1973) and *Rubber World*, "Compounding Radial Block Copolymers."

The binders of this invention preferably comprise a block copolymer consisting essentially of thermoplastic radial block copolymer. Of the radial block copolymers, those with aforedescribed "A" and "B" blocks are preferred, with aromatic "A" block and aliphatic "B" block being preferred. Other "A" and "B" blocks appear in Col. 2, line 56 through Col. 3, line 3 of U.S. Pat. No. 4,158,688. The preferred radical block copolymers, suitable for use in this invention have molecular weight ($M_w$) of about 100,000-200,000, a specific gravity between 0.9-1., and an apparent viscosity of between about 40-50 thousand poise at 10 seconds$^{-1}$ at about 20°-25° C.

The molecular weights of the "A" segments and the "B" segments of the block copolymers suitable for use in the method of this invention will vary with the polymer segment involved as will be obvious to one skilled in the art in that physical characteristics must be met as hereinbefore recited. For instance, where the block copolymer has polystyrene "A" blocks and polybutadiene "B" blocks, preferrably unsaturated polylbutadiene, the polystyrene segments advantageously have number average molecular weights ($\overline{M}_n$) below about 20,000 and at least two of such segments have molecular weights ($\overline{M}_n$) above about 10,000. While the polybutadiene segments advantageously have molecular weights ($\overline{M}_n$) below about 80,000 and at least one such segment has a molecular weight ($\overline{M}_n$) above about 15,000. The lower limit of molecular weight ($\overline{M}_n$) for the two "A" blocks is governed by the minimum "A" block chain length required to insure the formation of a heterogeneous phase while the upper limit of "A" blocks is set by the viscosity of both "A" and "B" blocks when such viscosity begins to hamper domain formation or processing.

The sacrifical binder employed in the method of this invention includes a plasticizer comprising oil and a wax in combination. The oils and waxes used for this purpose are naphthenic, paraffinic or a mixture of paraffinic and naphthenic constituents. They are sufficiently volatile to be removed easily and rapidly in the burn-out process but insufficiently volatile to be substantially removed during mixing and/or molding. The loss due to volatilization during mixing and/or molding is advantageously below 20 and preferably below 10 weight percent. The selection is such that their evolution during burn out takes place over a broad temperature range, thus avoiding stress points and defects in parts.

Functionally, the oils and waxes must be compatible with the rubbery phase of the principal binder resin when it becomes rubbery on plasticization at a temperature somewhat below the softening point of the "A" segments of the principal resin. This gives the binder a capability of accepting higher filler loadings while remaining strong and flexible.

At least 75% by weight of the oils used as plasticizers boil in the range of about 285° C. to about 560° C., preferably in the range of about 285° C. to about 465° C. They have viscosities at 100° F. in the range of about 30 to about 220 Saybolt Universal Seconds, hereinafter referred to as S.U.S., advantageously in the range of about 35 to about 155 S.U.S., and preferably in the range of about 35 to about 80 S.U.S. These oils have an Aniline Point in the range of about 75° F. to about 125° F. The oils may be a product of petroleum refining operations or vegetable or animal oils and they may include or be low molecular weight synthetic polymers such as polystyrene, poly(alpha-methyl styrene), or a polyolefin. Examples of suitable commercially available oils include Flexon 580, 680, 765 and 845 marketed by Exxon and Shellflex 131, 371 and 790 marketed by Shell Chemical Co.

The waxes used have melting points in the range of about 55° C. to about 80° C. At least about 75% by weight of such wax boils at temperatures in the range of about 315° C. to about 490° C. These may be a product of petroleum refining operations, vegetable or animal oils or synthetic polymers such as low molecular weight polyolefins. Examples of suitable commercially available waxes are Sunoco Wax 3420, 4412 and 4418 marketed by Sun Chemical as well as paraffin wax (M.P. 54° F.) marketed by International Wax Refining.

The binder of this invention further includes a first and a second stiffening thermoplastic polymer which are glassy or crystalline at 20°-25° C., have a softening point between about 80°-250° C. and comprise aromatic monomeric units associable with the block copolymer. The stiffening polymer preferably has a molecular weight in the range between about 50,000 and 400,000, more preferably 100,000 and 300,000, wherein such molecular weight refers to a weight average molecular weight (Flory). The second stiffening polymer is different from the first stiffening polylmer and also functions as a tackifying thermoplastic polymer. Preferred second stiffening polymers have a melt viscosity of about 10 poises at 157°-205° C.

For example, if the "A" block of the block copolymer is a polystyrene, then the first stiffening thermoplastic polymer preferably is a polystyrene or other thermoplastic aromatic polymer. In addition to stiffening, such a thermoplastic polymer should also aid in mixing the sacrificial binder composition ingredients. A thermoplastic polystyrene polymer such as Styron 495, marketed by Dow Chemical Company, does this because it has a lower viscosity than the thermoplastic block copolymer at processing conditions; on the other hand it is sufficiently crystalline at room temperature to advantageously stiffen the formed green body. Furthermore, according to this example, if the first stiffening polymer is polystyrene as mentioned, the second stiffening polymer is aromatic but has a different aromatic moiety, e.g., indene. A preferred second polymer is polyindene. Low molecular weight polyidenes have the further advantage of low viscosity at processing conditions. The low viscosity aids flow of the sacrificial binder compositions.

Using two different polymers also advantageously permits the sequential expulsion of the stiffening polymers during firing of the green bodies.

The process aid comprising esters of fatty acids are preferably selected from acetyl ricinoleate esters, which are single and double esters of ricinoleic acid. Their presence serves as an effective processing aid, acting as an anti-stick agent during calendering and extruding. The acetyl ricinoleate esters are also useful in wetting and dispersing the ceramic particulate so as to form a homogeneous mixture. The most useful type of this plasticizer processing aid for the subject invention is the Flexricin plasticizer, such as Flexrincin P-4, methyl acetyl ricinoleate, and Flexricin P-6, butyl acetyl ricinoleate.

In this particular binder mixture, the weight of the thermoplastic block copolymer is greater than the weight of the oil and wax combined, and greater than the weight of the stiffening polymers combined. The weight of the block copolymer is also greater than two times the weight of the oil, the wax, the first stiffening polymer, the second stiffening polymer or the process aid alone.

Additional process aids which are conventional to molding and forming operations with polymeric materials are likewise useful in the practice of this invention to improve the flow characteristics of the binder-filler mixture to during such operations. Process aids which may be of assistance include fluorocarbon mold release agents, stearic acid, polyethylene, polyethylene wax, mixtures of natural waxes and wax derivatives, vegetable fats, partially oxidized polyethylene, polyterpenes resins, etc. Others will be apparent to those skilled in the art.

Other ingredients may be employed in the binders of this invention. For example, antioxidants are useful to retard oxidative degradation of the block polymer during mixing, thus minimizing loss of strength in the green body. The antioxidant also allows more rapid removal of binder during burn-off by minimizing surface oxidation which may tend to seal off the surface. Suitable antioxidants include, but not by way of limitation, 2,6-ditert-butyl-phenol, a polymerized 1,2-dihydro-2,2,4-trimethyl quinoline, 2-mercaptobenzimidazole, tetra-bis-methylene-3-(3,5-ditert-butyl-4-hydroxy phenyl) propionate methane, etc.

| Sacrificial Binders with Optional Components (Volume) Percent | |
|---|---|
| Component | (Binder 40–60 volume % of total) |
| Solprene 414C | 30–80 |
| Agerite Resin D | 0–6 |
| Sunoco Wax 3412 } Sunoco Wax 4412 | 5–20 |
| Styron 495 | 2–10 |
| Picco 6140-3 | 2–10 |
| Flexon 845 | 4–30 |
| Shellflex 371 | 5–25 |
| Flexricin P-4 | 2–10 |

Sinterable Particulate

The powdered beta"-alumina precursor particulate useful in the practice of the method of this application has a particle size (diameter) distribution of between about 0.1–850 microns, with a preferred average particle size of greater than 3.5 microns, most preferably between about 3.5 microns. The preferred beta"-alumina precursor particulate is prepared by combining sodium carbonate, lithium nitrate and alpha-alumina (Linde C) in such amounts as to form a beta"-alumina precursor particulate composition which comprises 8.85% soda/0.75% lithia/90.40% alumina by weight.

The following examples are presented by way of description of the process of the invention and to set forth the best mode contemplated by the inventors, but are not to be construed as limiting.

EXAMPLE 1

Tubes having 12 mm outside diameter were prepared by extrusion of a typical binder mixture containing the following ingredients. Their length was from 3–20 cm.

| Binder Component | Wt. gms. | Wt. % | Volume % |
|---|---|---|---|
| Solprene 414C | 4.80 | 7.75 | 40% of Binder |
| Agerite Resin D | 0.53 | 0.85 | 4% of Binder |
| Sunoco Wax 3420 | 1.15 | 1.86 | 10% of Binder |
| Sunoco Wax 4412 | 0.90 | 1.45 | 8% of Binder |
| Styron 495 | 0.70 | 1.13 | 5% of Binder |
| Picco 6140-3 | 0.70 | 1.13 | 5% of Binder |
| Flexon 845 | 0.54 | 0.87 | 5% of Binder |
| Shellflex 371 | 1.70 | 2.74 | 15% of Binder |
| Flexricin P-4 | 0.94 | 1.52 | 8% of Binder |

-continued

| Binder Component | Wt. gms. | Wt. % | Volume % |
|---|---|---|---|
| beta"-alumina precursor mix (8.85% Na$_2$O, 0.75% Li$_2$O and 90.40% Al$_2$O$_3$) | 50.00 | 80.70 | 55% of total |

(a) The Preparation of a Powdered B"-alumina Precursor: Dried samples of Na$_2$CO$_3$ and LiNO$_3$ were mixed with Linde C Al$_2$O$_3$ and milled for one hour in a polyethylene container using high-purity Al$_2$O$_3$ balls. The ratio of reagents was chosen so that the final products would have compositions of 8.85% Na$_2$O—0.75% Li$_2$O—90.40% Al$_2$O$_3$ by weight. The powders were calcined for two hours at 1260° C. in platinum crucibles. On cooling the powders were crushed and milled for one hour in polyethylene vessels using Al$_2$O$_3$ balls. X-Ray defraction indicated the composition of the milling operation effectively broke down the loosely bonded agglomerates formed during calcination.

Mixing of the binder composition is carried out on a 80×180 mm two-roll, vented research mill. The mill rolls were electrically heated with individual heat controls and chrome coated. The mill speed was 3.2 m per minute and had a friction ratio of 1.4 to 1. The gap between the rolls varied from 0.17 to 0.76 mm during mixing. The temperature of both rolls was set at 155° C. and allowed to stabilize.

The order of addition of binder ingredients and specific conditions used in the mixing steps are listed below:

1. Set roll gap at 0.17 mm and add thermoplastic elastomer (Solprene 414). As soon as a Solprene 414 melt is formed on the rolls, add 5% by wt. of beta"-alumina precursor and the Agerite resin D.

2. Subsequently keep opening the mill rolls and adding the rest of the beta"-alumina precursor. The gap between the two rolls should be 0.70–0.76 mm at the completion of addition of beta"-alumina precursor.

3. Add petroleum waxes slowly (Sonoco wax 3420 and 4412). The powdery material falling off the mill rolls is placed on mill rolls continuously. The banded material at edges of rolls is cut with sharp knife and placed on center of rolls repeatedly. The temperature of rolls is raised to 160° C. for the next step.

4. Then polystyrene (Styron 495) and polyindene resin (Picco-6140-3) are added to the mix in that order. The mix is still crumbling at this stage. The banded material at edges of rolls is cut continuously and placed in center of rolls until completion of mixing.

5. The addition of Flexon 845 and Shellflex 371 follows with cutting of material at edges of rolls and returning the cut and crumbled material to the middle of rolls.

6. Flexricin P-4 is incorporated to the mix slightly slower than the other two oils. The temperature of rolls is brought to 138° C. before initiation of addition of Flexricin P-4.

7. Upon completion of addition of all the ingredients, the mix is cut at edges of rolls and sliced in middle of rolls for 5 minutes. The cut material is returned to the center of rolls.

8. Mixing is completed within 40–45 minutes.

9. The mill is set at a speed of 1.5 m/per and the mix is sliced off the mill and transferred to the extrusion set-up.

10. Total weight of mixed material is 62.0 gms.

At the completion of mixing cycle, the binder composition is homogeneous. This is indicated by breaking a small piece of tape and examining its consistency.

(c) Extrusion

A ram type extrusion apparatus was to extrude the green body tubes. The techniques for extruding different sizes of tubes (diameter and wall thickness) differed primarily in the die set used for the extrusion.

To perform the extrusion, mixed binder and ceramic composition is broken or cut into a size convenient for insertion into the barrel of the extruder. After insertion into the preheated extruder barrel, the ram is inserted and a force of approximately 250 kg to 500 kg is applied to pack the composition. At this point the ram is stopped and the force allowed to decay as the composition is preheated for about 15 minutes prior to extrusion. After the preheat, the ram is once again forced against the composition until tube extrudes from the die orifice. The rate at which tube is extruded and the temperatures of the barrel and die are adjusted until a smooth tube is obtained. Typical extrusion rates are 600 mm/min for the 12 mm tube and 100 mm/min for the 7 mm tube. The tube is extruded over a mandrel of 10.5 mm diameter for the 12 mm tubing and 6.5 mm diameter for the 7 mm tubing. This is done to maintain straight tubing while the green body is still hot enough to deform easily. After a sufficient length of tubing has been extruded, it is cut from the die and placed on another mandrel for cooling to room temperature. After reaching ambient temperature, the tubing can be easily handled, cut and stored without use of a mandrel.

(d) End-Capping of the Tubes

The shaped caps were obtained by placing the same binder mixture (as mixture used to extrude tubes) on an 80×180 mm two-roll mill. After the material was banded, the rolls were adjusted for obtraining binder sheets with a thickness of 1 mm. Circular disks were cut from the binder sheets with a disk diameter equal to the outside diameter of tube (12 mm). Hemispherically shaped caps were obtained by taking disks cut from the molled sheet and pressing these disks into a hemispherical teflon cavity (heated to 150° C.). Using a brass or steel mandrel whose end has been shaped to give the device the hemispherical shape of the interior of the end-cap.

The apparatus used for ultrasonic end-capping was a Branson, Model 400C, Ultrasonic Welder. Using this ultrasonic welder, molded caps of a variety of shapes have been successfully bonded. A tube which has been carefully cut to give a smooth surface whose face is perpendicular to the length of the tube is placed over a mandrel. The horn of the ultrasonic welder (Branson, Model 400C, ultrasonic welder) has a tube shape with a hemispherical end cut into the base of the horn. The end-cap is then centrally placed on top of the mandrel. Alternately but less desirably, the end-cap is placed up into the horn and positioned with a solid rod having a flat end cut perpendicular to the length of the rod. The horn of the ultrasonic welder is then carefully brought down to give initial contact between the end-cap and the tube. Ultrasonic power is applied while the horn is lowered to its final position to produce the bond. The various horns used for end-capping different diameter (O.D.) and thickness tubes were tuned to between 19,950 and 20,000 Hz. Although not mandatory, a better success rate in producing helium leak tight end-capped tubes was achieved if the tubes were rotated during the ultrasonic bonding. Generally, a total time of 15 seconds from power on to power off was adequate. It has been found advantageous to apply ultrasonics for 3 to 5 seconds prior to applying pressure with the ultrasonic horn, after which the ultrasonics are applied for 5 to 15 seconds with this pressure. Pressure may be retained for 5 to 10 seconds after the ultrasonics are turned off, in order to allow the end-capped tube to cool, and then the horn is raised to allow removal of the tube from the mandrel. For better ultrasonic end-capping, it was found necessary, in order to obtain better sealing, to use high amplitude vibrations. As a result, a black booster horn was attached between the converter and aluminum horn. This change resulted in increasing the amount of amplitude by 2.5 times at the face of horn. This increased amplitude was most suitable for end-capping.

Binder Removal

Binder removal is accomplished by heating the tubes in a circulating oven (Temperite, Type Mu 182424A) using filtered air as the atmosphere. It has been found to be advantageous to support the tubes in a vertical position by slipping them over an alumina mandrel whose diameter is small enough to allow for shrinkage of the tube during binder removal. The tubes were removed from the burn-out oven and placed immediately in a desiccator which has been preheated to 65° C. Tubes and desiccator are allowed to cool to room temperature and the tubes are held in the desiccator until needed for sintering. A typical burn-out schedule is found in the following table.

| Temperature Range °C. | Rate °C./Hour |
| --- | --- |
| 25–150 | 23 |
| 150–600 | 9.7 |
| 600 | hold for 4 hours |
| 600–150 | 52 |
| 150 | hold for 7.3 hours |
| 150–65 | Allow oven to cool at its own rate |

(f) Sintering

After binder burn out tubes were encapsulated in platinum cylinders and arranged in vertical positions in a cold furnace. The furnace was slowly heated to 1585° C., held for fifteen minutes, cooled to 1400° C., held for one hour, then allowed to cool to room temperature.

After burn out and sintering of end-capped tubes, it was found that they were hermetically sealed. Hermeticity was checked with a Veeco Model 12 helium leak detector. The resistivity and modulus of rupture of the sintered 10 mm O.D. tube were 4.6 ohm-cm at 300° C. and 500 $MN/CM^2$ respectively. The efficiency of sound end-capped tubes was good. During burn out and sintering, tubes shrink by approximately 20%.

EXAMPLE 2

The procedure of Example 1 was repeated with the exception that the hemispherically shaped cup was grinded with a brass screen so that complete contact between tube and cap was obtained before the application of ultrasonic vibrations. The efficiency of leak tight end-capped tubes was slightly increased. No flash was generated by the end-capping process.

EXAMPLE 3

Example 1 was repeated with the exception that flat disks with a 12 mm diameter were used for the end-capping. Leak tight end-capped tubes were obtained. The efficiency of sound end-capped tubes was slightly lower because of misalignment of cap and tube.

EXAMPLE 4

The procedure of Example 1 was repeated with the exception that the end-cap had a piston-like shape. It was prepared by compression molding of binder composition at 150° C. Half of this cap had a diameter equal to the inside diameter of tube and half had a diameter equal to the outside diameter of tube. Upon application of ultrasonics, end-capped tubes with good hermeticity and properties were obtained.

EXAMPLE 5

Example 1 was repeated with the exception that a hemispherically shaped end-cap was prepared by compression molding. For higher efficiency of ultrasonically end-capped tubes, the joining of tube to cap should take place close to the end of hemispherical section. The ultrasonic intensity of horn is not as high in straight section as in hemispherical.

EXAMPLE 6

Example 1 is repeated with the exception that a higher pressure is exerted on the part by the horn. Upon application of over 100 lbs pressure on green tube, crack formation increases and efficiency at leak tight tubes decrease.

EXAMPLE 7

The procedure of Example 1 is repeated with the exception that the area of cap to be attached to the tube is exposed to methylene chloride before application of ultrasonic vibrations. At the completion of welding the tube-cap interface is not visible. Thus the appearance of end-capped tubes was improved. These tubes were leak tight.

EXAMPLE 8

Example 1 is repeated again with the exception that a larger diameter disk was used (15-17 mm). This size disk was chosen to avoid misalignment problems in end-capping but we run across the flash problem arising from larger diameter disks. Both of these problems were eliminated by heating the disk at 150° C., placing it over the tube, and lowering the horn for the application of ultrasonic vibrations. On lowering the horn, the hot disk was shaven off by horn to optimum diameter. The end-capped tubes were leak tight and had good appearance.

EXAMPLE 9

Upon repeating Example 8, the larger diameter disk and tube were heated at 150° C. before the application of ultrasonic vibrations. Upon welding the cap to the tube there was buckling of tube close to the interface.

EXAMPLE 10

An 18 mm tube (outside diameter) was precision cut to a length of 10 cm as the 12 mm tube of Example 1. A disk with a diameter of 22 mm was stamped out from a milled sheet of binder material. After heating the disk at 150° C., it was placed on tope of tube and horn was brought down to make contact with the parts. On lowering the horn, the cap was shaven off to suitable size for end-capping. Leak tight tubes were obtained after burn out and sintering.

EXAMPLE 11

The procedure of Example 10 was repeated with the exception that the length of the 18 mm tube is 20 centimeters. A longer mandrel for supporting the tube was constructed for use in end-capping these longer tubes. Upon application of ultrasonic vibration the cap was attached to the tube. The hermeticity of tubes determined with the helium leak detector was good.

EXAMPLE 12

The procedure of Example 11 was repeated with the exception that the thickness of disk was changed from 1.4 mm to 2 mm. Upon application of ultrasonic vibrations, sealed tubes were obtained with good hermeticity. The joint area was not as smooth as in tubes of example 11.

EXAMPLE 13

The procedure of Example 10 was repeated with the exception that the ultrasonic horn was coated with a teflon coating. The end-capped tubes had no aluminum film originating from aluminum horn. They were hermetically sealed.

EXAMPLE 14

The procedure of Example 1 was repeated with the exception that Flexricin P-4 was increased from 0.94 gms to 1.17. On compounding this mixture, it was softer and was used for preparation of disks. The tubes were prepared by using the amounts of binder components of Example 1. Tubes with good hermeticity were obtained. The joint area was smooth. A softer cap and a stiffer tube were preferred.

EXAMPLE 15

The volume fraction of beta"-alumina precursor powder in Example 1 was increased to 56% and the volume fraction of organic ingredients was reduced to 44% of total mix. The procedure of example 1 was repeated and good end-capped tubes were obtained.

EXAMPLE 16

The volume fraction of beta"-alumina precursor powder in Example 1 was reduced to 54% and the volume fraction of organic ingredients was increased to 46% of total mix. Upon repeating the procedure of Example 1, end-capped tubes with good hermeticity were obtained.

EXAMPLE 17

Another binder mixture is prepared with the exception of reducing the amount of wax 3420 by 0.35 grams and incorporating 0.35 grams of Wingtack 95. Tubes (18 mm O.D.) and disks made from this mixture were used for end-capping as in example 1. The strength of bond in these end-capped tubes was higher. Good end-capped tubes were obtained.

EXAMPLE 18

Another binder mixture is prepared with the exception of reducing the amount of wax 3420 by 0.50 grams and incorporating 0.50 grams of Wingtack Plus. A homogeneous mixture was obtained after mixing ingredients. Good end-capped tubes were obtained from this mixture after it was aged for a month. The Wingtack resins is particularly useful in situations involving delayed end-capping of the tubes.

EXAMPLE 19

Tubes with an outside diameter of 7 mm and disks with 0.5 mm thickness were prepared from binder compound described in Example 1. Upon ultrasonic end-capping the closed tubes bulged close to the joint area. This is due to the fact that thin wall tubes cannot take pressure as well as thicker tubes.

EXAMPLE 20

The tubes and disks described in Example 19 were used again for end-capping. The tube was supported by placing a grass sleeve around the tube. Upon application of ultrasonic vibrations, the bulging on closed tubes was reduced.

EXAMPLE 21

The procedure of Example 1 was repeated with the exception that the powder beta"-alumina precursor had the composition 8.7% $Na_2O$/0.7% $Li_2O$/90.6% $Al_2O_3$. The efficiency of the tubes was not as high as when using the composition of Example 1.

EXAMPLE 22

The procedure of Example 1 was repeated with the exception that the powdered beta"-alumina precursor had the composition 9.0% $Na_2O$/0.8% $Li_2O$/90.2% $Al_2O_3$. The efficiency of the tubes was not as high as when using the composition of Example 1.

EXAMPLE 23

The procedure of Example 8 is repeated with the exception that the larger disk is not heated before the application of ultrasonics. The closed tubes are rubbed with methylene chloride at interface to remove excessive flash. Efficiency is not as high as in Example 8.

EXAMPLE 24

The procedure of Example 23 is repeated with the exception that methyl ethyl ketone is used for removal of excessible flash. The solvent is removed from tube interface very slowly. The efficiency of sound tubes is not as high as in cases where no solvent is used.

EXAMPLE 25

Example 1 was repeated with the exception that ultrasonic forming was used for closing one end of the circulat 12 mm outside diameter tube. A tube which has been carefully cut to give a smooth surface whose face is perpendicular to the length of the tube is placed over a mandrel. The horn of ultrasonic welder (Branson Model 400 C) which has a hemispherical cavity cut into the face of the horn is then carefully brought down to make contact with the end of tube. Ultrasonic power is applied while the black booster horn (high amplitude vibrations) is lowered to its final position for closing the tube. Ultrasonic forming uses no end-caps. Upon burn out of binder and sintering, the tube were formed to be hermetically sealed. As with ultrasonic bonding it was found advantageous to rotate the tubes during this process to form an even smooth shape.

EXAMPLE 26

Example 25 was repeated with the exception that the outside diameter of tube is 25 mm. These tubes were ultrasonically formed. After burn out of binder and sintering, the tubes had good properties.

EXAMPLE 27

Example 25 was repeated with the exception that the outside diameter of tube was 18 mm. The tubes were rotated during ultrasonic forming. The formed tubes had improved appearance.

In the above Examples 1–27, Solprene 414C is a thermoplastic elastomer manufactured by Phillips Petroleum. It is a radial block copolymer of styrene and butadiene with a molecular weight ($\overline{M}_w$) of about 160,000. The 414C has a specific gravity of 0.95, melt flow of 72 (grams/10 min. at 190° C. and apparent viscosity of 46,000 poise at 10 sec.$^{-1}$ at room temperature. Agerite Resin D is an antioxidant available from Vanderbilt Company; it is a polymerized 1,2-dihydro-2,2,4-trimethyl quinoline. Typical properties of Agerite Resin D are specific gravity=1.06; softening point +74° C.; and very soluble in acetone Sunoco Wax 3420 is a paraffinic wax that melts at 58° C. Specific gravity at 150° C. is 1.2 g/cc and kinematic viscosity is 3.6 centistokes at 99° C. Sunoco Wax 4412 is a paraffinic wax that melts at 63° C. Specific gravity is 0.925 at 60° C. and kinematic viscosity at 99° C. is 4.2 centistokes. Styron 495 is a polystyrene available from Dow Chemical Company; it has a vicat softening point of 97° C., melt flow rate of 3.5 grams/10 min. and specific gravity of 1.05 at 150° C. Styron 495 has a molecular weight ($\overline{M}_w$) of about 200,000. Picco 6140-3 is a polyindene available from Hercules; its melt viscosity is 10 poises at 205° C. The softening point is 140° C. and density 1.07 at 25° C. Flexon 845 is a paraffinic petroleum oil from Exxon Chemical Company. Flexon 845 has a viscosity of 230 SUS at 99° C. and Aniline Point is 117° C. Shellflex 371 is a paraffinic-naphthenic oil available from Shell Oil Company. Shellflex has a specific gravity of 0.897 at 150° C.; it has 49% paraffinic carbon, 50% naphthenic carbon and 1% aromatic carbon. The molecular weight is 400, viscosity at 38° C. is 427 SUS., and Aniline Point is 100° C. Flexricin P-4 is methyl acetyl ricinoleate. Its specific gravity is 0.936 and boiling point at 2 mm is 185° C. Its molecular weight is 346. Wingtack Plus are resins available from Goodyear Chemical Company. Wingtack 95, considered a synthetic polyterpene, has a softening point of 100° C. Specific gravity at 25° C. is 0.93 and molecular weight of 1200. Wingtack Plus, a polyterpene resin has a softening point of 94° C., specific gravity of 0.93 and molecular weight of 1100.

In view of this disclosure, many modifications of this invention will be apparent to those skilled in the art. It is intended that all such modifications which fall within the true scope of the invention will be included within the terms of the appended claims.

What is claimed is:

1. A method of ultrasonically end-capping a tubular green body which comprises:
(A) providing a tubular green body comprised of a mixture of about 40–60 volume percent sinterable particulate solids and 60–40 volume percent organic sacrificial binder, wherein said binder consists essentially of:
(a) a thermoplastic block copolymer component selected from the group consisting of linear, radial and linear and radial block copolymers, having a first aromatic block which is glassy or crystalline at 20°–25° C., and which has a softening point between about 80°–250° C. and a second aliphatic block which is different from said first block and behaves as an elastomer at temperatures between about 15° C. below and about 100° C. above said softening point of said first block;

(b) oil at least about 75 percent by weight of which boils in a range between about 285°–560° C., has a viscosity of between about 30–220 Saybolt Universal Seconds (SUS) at 100° C., and has an Aniline Point in the range between about 75°–125° C.;

(c) wax which melts at a temperature in a range between about 80° C. and at least 75 percent by weight of which boils at temperatures in a range between about 315°–490° C.;

(d) a first stiffening thermoplastic polymer which is glassy or crystalline at 20°–25° C., has a softening point between about 80°–250° C. and comprises aromatic monomeric units associable with the block copolymer (a);

(e) a second stiffening thermoplastic polymer, different from said first polymer and which is glassy or crystalline at 20°–25° C. and comprising aromatic monomeric units associable with the first block and has a softening point below about 80°–250° C.

(f) processing aid comprising an ester of fatty acids; and said sinterable particulate solids consisting essentially of a particle size distribution of beta''-alumina precursor particulate solids, the weight of (a) being greater than (b) and (c) combined, greater than (d) and (e) combined and greater than about two times (b), (c), (d), (e) or (f) alone; and (B) forming an end-cap of desired configuration having a composition comprising said mixture;

(C) applying pressure and ultrasonic vibrations by means of an ultrasonic horn to said tubular green body and end-cap between a tubular mandrel and said ultrasonic horn, said mandrel having a shaped end of desired configuration and the ultrasonic horn having a female mold shape adapted to receive said mandrel with said tubular body disposed therein;

(D) maintaining said pressure and ultrasonic vibrations for a time necessary for ultrasonic vibrations to travel to the tubular body end-cap interface, wherein they are dissipated in the form of frictional heat and melt said binder so as to weld the joining surfaces.

2. A method in accordance with claim 1, wherein said tubular green body disposed on said mandrel has faces perpendicular to length of said body.

3. A method in accordance with claim 2 wherein said end cap comprises a disc shaped end cap.

4. A method in accordance with claim 3 wherein said end-cap comprises hemispherically shaped end-cap.

5. A method in accordance with claims 3 or 4 wherein said end-cap is centrally placed on top of said mandrel prior to applying said pressure and ultrasonic vibrations.

6. A method in accordance with claims 3 or 4 wherein said end-cap is placed up into said ultrasonic horn prior to applying said pressure and ultrasonic vibrations.

7. A method according to claims 1, 3 or 4 wherein said desired configuration of said mandrel and said ultrasonic horn is hemispherical.

8. A method in accordance with claim 1, wherein said end-capping further comprises applying only said ultrasonic vibrations for a time prior to applying ultrasonic vibrations and pressure at the same time.

9. A method in accordance with claim 8 wherein said end-capping still further comprises applying only said pressure for a time after applying ultrasonic vibrations and pressure at the same time.

10. A method in accordance with claim 1, wherein forming said end-cap comprises forcing said tubular body between said mandrel and said ultrasonic horn until a continuous smooth end-cap has been formed while applying ultrasonic vibrations to said tubular body.

11. A method in accordance with claim 10, wherein said desired configuration of said mandrel and ultrasonic horn is hemispherical.

12. A method in accordance with claims 1, 2, 3, 8, 9 or 10, wherein said tube is rotated during said application of ultrasonic vibrations.

13. A method in accordance with claim 1, wherein said block copolymer comprises said radial block copolymer.

14. A method in accordance with claim 13 wherein said first block comprises a copolymer of styrene.

15. A method in accordance with claim 14, wherein said second block comprises a polymer of butadiene.

16. A method in accordance with claim 15, wherein said polymer of butadiene comprises an unsaturated polymer.

17. A method in accordance with claim 16 wherein said first stiffening polymer comprises a polystyrene thermoplastic.

18. A method in accordance with claim 17, wherein said second stiffening polymer comprises a polyindene thermoplastic.

19. A method in accordance with claim 18, wherein said radial block copolymer has a molecular weight ($M_w$) of about 100,000–200,000.

20. A method in accordance with claim 19 wherein said radial block polymer has a specific gravity between about 0.9–1.

21. A method in accordance with claim 20 wherein said block polymer has an apparent viscosity of between about 40–50 thousand poise at $10^{-1}$ sec. and about 20°–25° C.

22. A method in accordance with claim 1, wherein said particle size distribution of said beta''-alumina particulate precursor comprises particle sizes of between about 0.1–850 microns.

23. A method in accordance with claim 22 wherein said average particle size is greater than about 3.5 microns.

24. A method in accordance with claim 23 wherein said average particle size is between about 3.5–20 microns.

25. A method in accordance with claim 19 wherein composition of said beta''-alumina precursor particulate comprises 8.85 weight percent $Na_2O$, 0.75 weight percent $Li_2O$, and 90.40 weight percent $Al_2O_3$.

26. A method in accordance with claim 25 wherein said processing aid is acetyl ricinoleate ester.

27. A method in accordance with claim 26 wherein said processing aid is selected from methyl acetyl ricinoleate and butyl acetyl ricinoleate.

28. A method in accordance with claim 27 wherein said tubular green body was formed by extrusion.

29. A method in accordance with claim 28 which further comprises subjecting the end-capped green body to binder burn out and sintering.

* * * * *

UNITED STATES PATENT AND TRADEMARK OFFICE
CERTIFICATE OF CORRECTION

PATENT NO. : 4,364,783
DATED : December 21, 1982
INVENTOR(S) : Ares N. Theodore et al It is certified that error appears in the above-identified patent and that said Letters Patent are hereby corrected as shown below:

At column 15, line 15, cancel "80°C." and replace with --55° - 80°C.--;

At column 15, line 27, cancel "below about 80° - 250°C." and replace with --between about 80° - 250°C.,--; and At column 15, line 43, cancel "therein" and replace with --thereon--.

Signed and Sealed this

Twelfth Day of April 1983

[SEAL]

Attest:

GERALD J. MOSSINGHOFF

Attesting Officer   Commissioner of Patents and Trademarks